United States Patent [19]

Miyakawa

[11] Patent Number: 4,550,327

[45] Date of Patent: Oct. 29, 1985

[54] DEVICE FOR DISCHARGING LIQUID DROPLETS

[75] Inventor: Akira Miyakawa, Tanashi, Japan

[73] Assignee: Canon Kabushiki Kaisha, Tokyo, Japan

[21] Appl. No.: 659,504

[22] Filed: Oct. 10, 1984

Related U.S. Application Data

[63] Continuation of Ser. No. 453,159, Dec. 27, 1982, abandoned.

[30] Foreign Application Priority Data

Jan. 8, 1982 [JP] Japan ..................................... 57-933

[51] Int. Cl.⁴ ........................ G01D 15/18; H01C 7/06

[52] U.S. Cl. .................................... 346/140 R; 338/28

[58] Field of Search ............... 346/140 R; 338/25, 26, 338/27, 28

[56] References Cited

U.S. PATENT DOCUMENTS 3,761,953 9/1973 Helgeson et al. ................. 346/75 X 4,337,467 6/1982 Yano ............................... 346/1.1 X

FOREIGN PATENT DOCUMENTS 455249 11/1975 U.S.S.R. ................................ 338/25

OTHER PUBLICATIONS

*IBM Technical Disclosure Bulletin,* vol. 8, No. 3, 8-65, "Semiconductor Temperature Sensor", E. E. Gardner.

*Primary Examiner*—E. A. Goldberg

*Assistant Examiner*—Gerald E. Preston

*Attorney, Agent, or Firm*—Fitzpatrick, Cella, Harper & Scinto

[57] ABSTRACT

A device for discharging droplets liquid within nozzles as liquid droplets by utilizing thermal energy comprises said nozzles each provided therein or thereby with a conductive element to detect the state of liquid in the nozzle by measuring the change of electric current passing the conductive element.

6 Claims, 4 Drawing Figures

DEVICE FOR DISCHARGING LIQUID DROPLETS

This application is a continuation of application Ser. No. 453,159, filed Dec. 27, 1982, now abandoned.

BACKGROUND OF THE INVENTION

1. Field of the Invention

This invention relates to devices for discharging liquid droplets and more particularly to a droplet-jet system for discharging liquid such as ink as liquid droplets by utilizing thermal energy.

2. Description of the Prior Art

In the prior art droplet-jet system, the amount of liquid or ink in the ink reservoir or the presence of ink in the ink paths connecting the reservoir with the ink-discharging nozzles is detected for the integrity of ink supply to continue the proper discharge of ink droplets. Consequently, it is impossible or uncertain to find out whether the nozzle is filled or unfilled with ink and how much ink remains in the system, when entrainment of bubble or interruption of ink flow is caused by shock or vibration.

In other words, the detection of presence of ink in each nozzle is inferred from the detection in the ink paths or the ink reservoir. Therefore, the detection by the prior art is uncertain.

Some means of detecting ink in each nozzle, devised for solving problem are to observe the nozzle with the eye, to observe the recorded ink dot with the eye or an optical sensor, or to observe flying ink droplets with an optical sensor.

However, the observation of ink dots with the eye or the optical sensor separately from one another is an extremely troublesome and mistakable thing since the distribution of nozzles is highly densified and the diameter of each ink dot is very small. The observation with an optical sensor needs an apparatus of generous size and of increased cost for detecting a minute liquid droplet. In addition, this method is subject to effects of extrinsic factors.

In droplet-jet systems utilizing thermal energy to discharge liquid droplets, when orders to discharge are given to a nozzle unfilled with ink on account of the entrainment of bubble or interruption of ink supply, the electrothermal energy converter and the vicinity thereof undergo an undesirable influence of heating, often deteriorating the performance of the nozzle and eventually leading the whole liquid droplet-discharging head to distruction. Accordingly, it is very important to detect exactly whether each nozzle is filled with ink.

SUMMARY OF THE INVENTION

The object of this invention is to provide a device for discharging liquid droplets free from the above-mentioned drawbacks, that is, an ink-jet system, compact and reliable, permitting exact detection of presence of ink or the presence of bubble in each ink-discharging nozzle.

According to the present invention, there is provided a device for discharging liquid within nozzles as liquid droplets by utilizing thermal energy comprises said nozzles each provided therein or thereby with a conductive element to detect the state of liquid in the nozzle by measuring the change of electric current passing said conductive element.

DETAILED DESCRIPTION OF THE PREFERRED EMBODIMENTS

Figure 1:
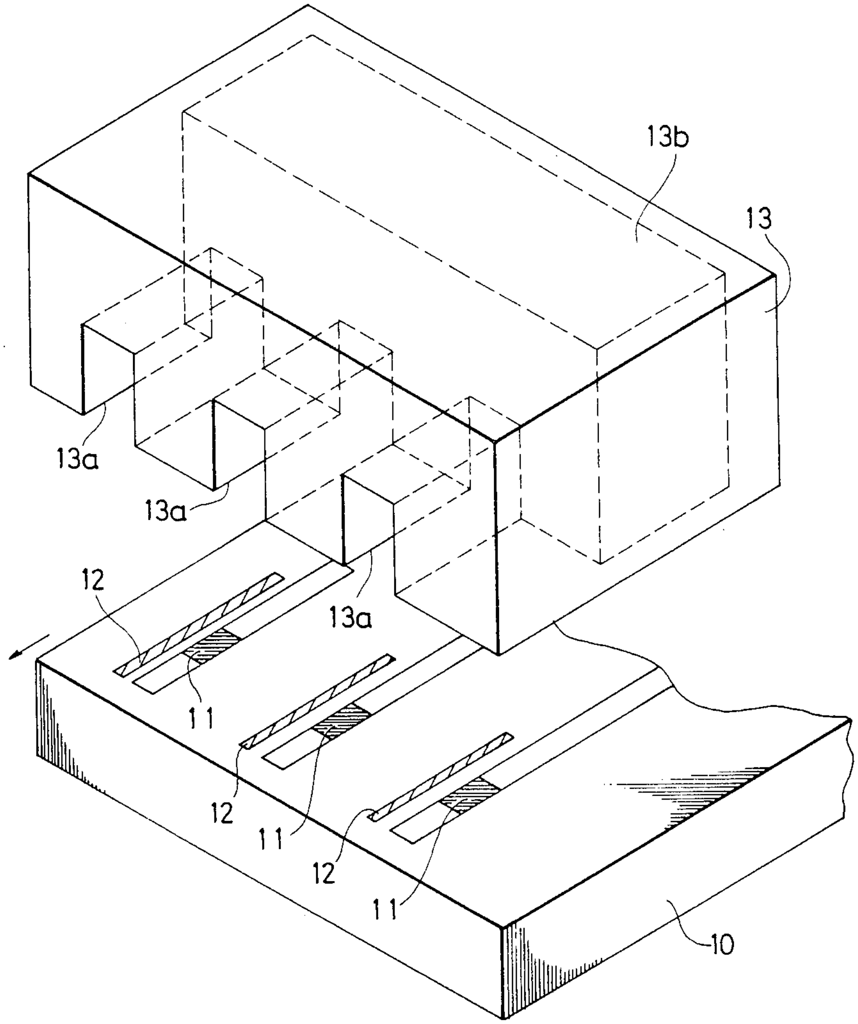
FIG. 1 is a perspective view outlining the structure of a preferred embodiment, a liquid droplet-discharging device, of this invention.
Figure 2:
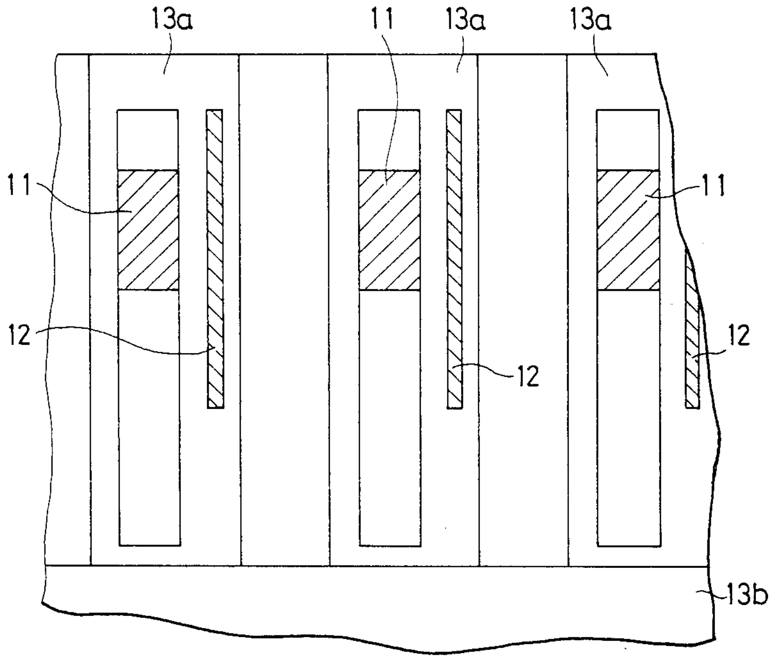
FIG. 2 is a detailed plan view of the nozzle section (ink-jetting head) of the device shown in FIG. 1.

Referring now to the preferred embodiment shown in FIGS. 1 and 2, this invention is described in detail.

FIGS. 1 and 2 show the principal part of the preferred embodiment: a device for discharging liquid droplets by utilizing thermal energy. On a base plate 10, electrothermal energy converters 11 corresponding to nozzles are disposed at virtually regular intervals (however, the regular intervals are not always required). The electrothermal energy converters 11 can be supplied with power from a power source (not depicted) to generate heat by conversion of electricity to thermal-energy. A conductive element 12 is disposed closely to each of the electrothermal energy converters 11. The conductive elements are connected separately to signal lines (not depicted) for detection. As mentioned below, a rise of temperature caused by thermal-energy of each converter 11 is detected by the change of electric resistance of the conductive element corresponding to said converter, since the resistance is relevant to a temperature of the element. On the base plate 10 is mounted a nozzle-constructing member 13 having a plurality of flow paths 13*a* corresponding to the nozzles. In this case, as shown in detail in FIG. 2 the member 13 is mounted on the base plate 11 in such a way that each converter 11 and each conductive element 12 correspond with each flow path 13*a*. The flow paths 13*a* extend backward to communicate with a flow common passage 13*b* which is formed in the rear of the nozzle-constructing member. The flow common passage 13*b* is connected with an ink reservoir (not depicted) through pipes.

The device having such construction operates as follows: each electrothermal converter 11, on applying a discharge signal after ink has been filled from the ink reservoir up to the tip of the nozzle, gives thermal energy to the ink in the nozzle to undergo a rapid change, thereby discharging ink droplets in the direction shown by an arrow in FIG. 1.

As is well known, the electric resistance of a conductive element 12 shows a dependence on the temperature thereof. In other words, the electric resistance of the conductive element, R, is represented by $\rho \times l/a$, wherein $\rho$, l, and a are the volume resistivity, length, and cross-sectional area, respectively, of the conductive element; the volume resistivity $\rho$ shows a dependence on temperature and is constant for a given element at a given temperature. Accordingly, when electric currents are kept to pass the conductive elements 12, the resistance of the conductive element 12 in a nozzle changes with the temperature rise by thermal energy generated with electrothermal converter 11 and hence the current passing the element 12 changes as well.

Figure 3:
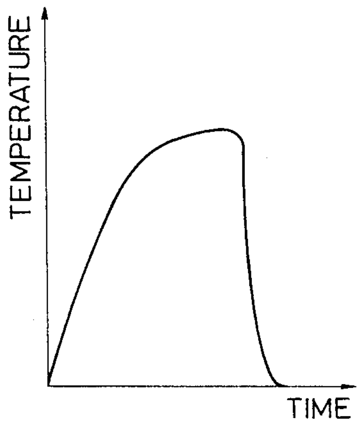
FIGS. 3 and 4 are graphs illustrating temperature changes with time in the nozzle which is filled and unfilled with ink, respectively, in the nozzle heated for a moment.
Figure 4:
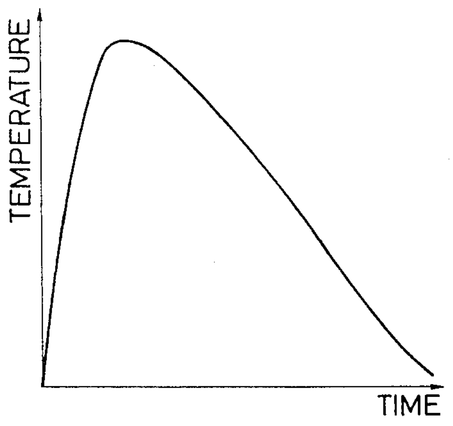

When the electrothermal converter 11 in a nozzle filled with ink is turned on for a moment, the temperature of the conductive element 12 rises and after a given time, rapidly drops, for instance, as shown in FIG. 3; on the other hand, when the nozzle is unfilled with ink for some reason or other, the temperature of the conductive element 12 rises more rapidly and up to a higher point and thereafter decreases gradually with time. Thus, it can be seen whether the nozzle is filled or unfilled with ink, by detecting current changes (e.g. dI/dt) due to such temperature changes by means of an external circuit.

Although electric currents are always passed through the conductive elements 12 in the above embodiment, the detection of ink in each nozzle is also possible by passing a current in pulses or measuring the time for a current to recover the original value (stationary value). It is also possible to locate the conductive element 12 not within the nozzle but at a position, opposed to the nozzle, on the outside of the base plate 10 or locate in within the block of the nozzle-constructing member 13.

As described above, according to this invention, a conductive element is provided in or near each nozzle and the state of liquid in the nozzle is detected by measuring the change of electric current through the conductive element with time; thus, the sensors, i.e. the conductive elements can be incorporated into the liquid droplet-discharging head, so that a highly reliable detection of said state is possible in a compact apparatus. In this ink-jet system, it is possible to stop giving a printing signal by detecting a rapid rise of electric current (dI/dt) upon applying pulse for detection to a vacant nozzle, or to add an automatic means of recovering the filled state of nozzle or an alarm means of giving a warning of the vacant state of nozzle; thereby securely protecting the device from the deterioration of its performance characteristics which would be caused by heating vacant nozzles thereof, and detecting non-discharge of ink. Consequently, the present invention provides an excellent device for discharging liquid droplets having high reliability.

What I claim is:

1. A device for discharging liquid as liquid droplets, comprising:

at least one nozzle for providing a liquid flow path;

heating means for applying thermal energy to an area of said nozzle; and means for detecting the absence of liquid in said area, including a conductive element having an electrical conductivity that varies according to the temperature of said conductive element, said conductive element being disposed proximate to said area for detecting changes in the temperature thereof in accordance with changes in the electric current passing through said conductive element.

2. A device according to claim 1, wherein said heating means includes a resistance heating element.

3. A device according to claim 1, further comprising a plurality of said nozzles.

4. A device according to claim 1, wherein said conductive element detects the rate of change of temperature of said area.

5. A device according to claim 4, wherein said heating means is disabled when the rate of change of the temperature of said area is above a reference level.

6. A device according to claim 5, wherein the reference level corresponds to the rate of change of the temperature of said area when there is an absence of liquid therein.

* * * * *